US012602347B2

(12) United States Patent

Nelson et al.

(10) Patent No.: US 12,602,347 B2

(45) Date of Patent: Apr. 14, 2026

(54) TUNNELING USB2 DATA USING USB4-BASED CONFIGURATIONS

(71) Applicant: Intel Corporation, Santa Clara, CA (US)

(72) Inventors: Aruni Nelson, Folsom, CA (US); Abdul Ismail, Beaverton, OR (US); Saranya Gopal, Bangalore (IN); Rajaram Regupathy, Bellandur (IN)

(73) Assignee: Intel Corporation, Santa Clara, CA (US)

( * ) Notice: Subject to any disclaimer, the term of this patent is extended or adjusted under 35 U.S.C. 154(b) by 804 days.

(21) Appl. No.: 17/828,350

(22) Filed: May 31, 2022

(65) Prior Publication Data

US 2023/0088416 A1 Mar. 23, 2023

(51) Int. Cl.
*G06F 13/42* (2006.01)

(52) U.S. Cl.
CPC .. *G06F 13/4282* (2013.01); *G06F 2213/0042* (2013.01)

(58) Field of Classification Search
CPC .................... G06F 13/4282; G06F 2213/0042
See application file for complete search history.

(56) References Cited

U.S. PATENT DOCUMENTS

| | | | | |
|---|---|---|---|---|
| 2002/0126751 A1* | 9/2002 | Scheurich | ............ | H04N 21/658 |
| | | | | 375/240 |
| 2013/0336334 A1* | 12/2013 | Gilbert | ...................... | H04J 3/16 |
| | | | | 370/458 |
| 2019/0317774 A1* | 10/2019 | Raghav | ................. | G06F 9/4411 |
| 2021/0055777 A1* | 2/2021 | Regupathy | .......... | G06F 9/30101 |
| 2022/0141709 A1* | 5/2022 | Simileysky | ......... | H04W 56/002 |
| | | | | 370/329 |

* cited by examiner

*Primary Examiner* — Eric T Oberly

(74) *Attorney, Agent, or Firm* — Schwegman Lundberg & Woessner, P.A.

(57) ABSTRACT

A Universal Serial Bus 4 (USB4) host system for tunneling USB2 data includes a USB controller and a first routing circuit communicatively coupled to the USB controller. The first routing circuit is to configure a downstream tunneled path between the USB controller and a second routing circuit. The first routing circuit is further to packetize outgoing USB2 data received from the USB controller into a first plurality of USB4 tunneled packets. The first routing circuit is further to encode the first plurality of USB4 tunneled packets for transmission to the second routing circuit via the downstream tunneled path, to initiate processing of the outgoing USB2 data by a USB2 device associated with the second routing circuit.

20 Claims, 6 Drawing Sheets

500

502

CONFIGURE BY A FIRST ROUTING CIRCUIT OF A USB4 HOST SYSTEM, A DOWNSTREAM TUNNELED PATH BETWEEN A USB CONTROLLER AND A SECOND ROUTING CIRCUIT

504

PACKETIZE OUTGOING USB2 DATA RECEIVED FROM THE USB CONTROLLER INTO A FIRST PLURALITY OF USB4 TUNNELED PACKETS

506

ENCODE THE FIRST PLURALITY OF USB4 TUNNELED PACKETS FOR TRANSMISSION TO THE SECOND ROUTING CIRCUIT VIA THE DOWNSTREAM TUNNELED PATH, TO INITIATE PROCESSING OF THE OUTGOING USB2 DATA

100

| | | HIGH SPEED PROTOCOLS | | | | | | | USB2 DATA | | | | | | | HIGH SPEED PROTOCOLS | | |
|---|---|---|---|---|---|---|---|---|---|---|---|---|---|---|---|---|---|---|---|
| A1 | A2 | A3 | A4 | A5 | A6 | A7 | A8 | A9 | A10 | A11 | A12 |
| GND | TX1+ | TX1- | V_BUS | CC1 | D+ | D- | SBU1 | V_BUS | RX2- | RX2+ | GND |
| GND | RX1+ | RX1- | V_BUS | SBU2 | D- | D+ | CC2 | V_BUS | TX2- | TX2+ | GND |
| B12 | B11 | B10 | B9 | B8 | B7 | B6 | B5 | B4 | B3 | B2 | B1 |

102    104    106

TUNNELING USB2 DATA USING USB4-BASED CONFIGURATIONS

TECHNICAL FIELD

Aspects pertain to wired communications between electronic devices. Some aspects relate to tunneling Universal Serial Bus 2 (USB2) data using USB4-based configurations (e.g., USB4-based solutions such as USB4 host systems).

BACKGROUND

The Universal Serial Bus (USB) is an interface standard originally intended for connection, communication, and power supply between host devices (e.g., a laptop, a personal computer, a display, an external storage device, or other types of peripheral devices including USB hubs) for plug-and-play capability. The USB protocol has been extended to industrial applications and as a way to charge mobile devices. The USB protocol is characterized by three generations of USB specifications, namely, USB 1.x, USB 2.0, and USB 3.x. The fourth generation of a USB specification (USB4) has been developed based on the Thunderbolt® 3 protocol specification. Even though the USB4 specification is associated with fast data transfers, current USB4 devices have limited capabilities for tunneling USB data.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1:
FIG. 1 illustrates a block diagram of a USB Type-C connector usage for communicating different types of data, in accordance with some aspects.

USB4 communication solutions build upon USB2 and USB3 solutions as well as Intel's Thunderbolt® technology. USB4 technology allows for data exchange between a USB4 host and a USB4 device over a USB Type-C connector using a USB Type-C cable. In some aspects, USB4 devices can have limited tunneling capabilities. Existing USB Type-C connector usage is based on using a separate physical layer (PHY) for USB2 and USB4 protocols (e.g., as illustrated in FIG. 1). In this regard, USB4 solutions do not tunnel USB2 data traffic and dedicated communication lines of the USB Type-C connector are needed to transmit USB2 traffic.

The disclosed techniques can include tunneling USB2 data traffic using USB4 tunneled packets to other endpoints and devices, such as USB devices, over a USB Type-C connector. More specifically, the disclosed techniques include tunneling USB2 data and sending such data along with other USB4 tunneled protocol packets over the Tx/Rx lines of a USB Type-C connection, without impacting the requirements for USB2 data transmission, and utilizing the existing USB4 PHY.

FIG. 1 illustrates a block diagram of a USB Type-C connector usage for communicating different types of data, in accordance with some aspects. Referring to FIG. 1, the USB Type-C connector 100 can be configured for high-speed communications of USB4 packets via communication link 102 (including pins A2, A3, B11, and B10) and communication link 106 (including pins A10, A11, B3, and B2). Additionally, the USB Type-C connector 100 can be configured for communication of USB2 data via communication link 104 (including pins A6, A7, B7, and B6 on dedicated D+/D− lines).

In some aspects, USB4 solutions (e.g., USB4-based circuits such as a USB4 host system) can drive 40 Gigabits/s (Gbps) throughput, which requires a separate communication path for USB2 traffic (e.g., using communication link 104). Using such a separate communication path, however, increases resource usage and implementation costs. In some aspects, USB4 tunneling architectures are configured so that only the USB3 data is transmitted over the USB4 PHY, and USB2 data is transmitted over a separate PHY as illustrated in FIG. 2.

Figure 2:
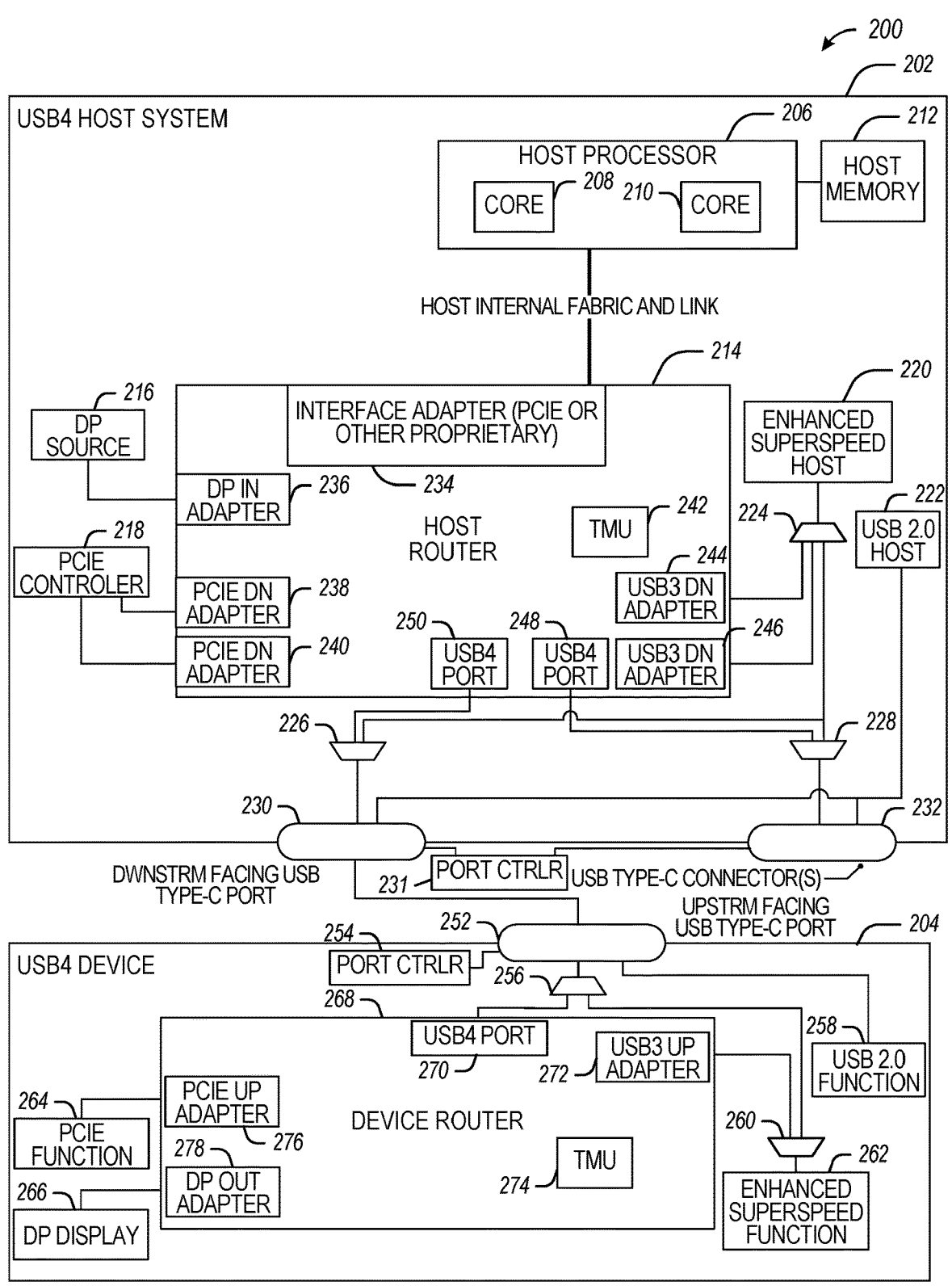
FIG. 2 illustrates a block diagram of a USB4 host system with USB2 processing outside the USB4 host router, in accordance with some aspects.

FIG. 2 illustrates a block diagram 200 of a USB4 host system 202 with USB2 processing outside the USB4 host router, in accordance with some aspects. Referring to FIG. 2, the USB4 host system 202 is communicatively coupled with the USB4 device 204. The USB4 host system 202 can include a host processor 206, a host router 214, a display port (DP) source 216, a PCIe controller 218, an enhanced superspeed host 220, a USB 2.0 host 222, multiplexers 224, 226, and 228, USB Type-C connectors 230 and 232, and a port controller 231 (associated with both USB Type-C connectors 230 and 232). The host processor 206 can include processing cores 208 and 210 and can be coupled to host memory 212.

The host router 214 can include an interface adapter 234 (e.g., for interfacing with the host processor 206), a DP input adapter 236, PCIe downstream adapters 238 and 240, a time management unit (TMU) 242, USB3 downstream adapters 244 and 246, and USB4 ports 248 and 250 (associated with corresponding USB Type-C connectors 230 and 232).

The USB4 device 204 can include a USB Type-C connector 252, multiplexers 256 and 260, a device router 268, a PCIe function 264 (which can be configured as a PCIe circuit), a DP display 266, a USB 2.0 function 258 (which can be configured as a USB 2.0 circuit or device), a port controller 254 (associated with USB Type-C connector 252), and an enhanced superspeed function 262 (which can be configured as an enhanced superspeed circuit associated with USB 3.0 data traffic processing).

As illustrated in FIG. 2, the USB4 host system 202 and the USB4 device 204 have protocol-specific adapters (e.g., DP, PCIe, and USB3-based adapters) which perform the packetizing of native data into USB4-specific tunneled packets and depacketizing of such packets. More specifically, the corresponding adapters (e.g., DP input adapter 236, PCIe downstream adapters 238 and 240, and USB3 downstream adapters 244 and 246) in the host router 214 of the USB4 host system 202 can receive corresponding native display data (e.g., DP data from DP source 216), PCIe data (e.g., from PCIe controller 218), and native USB data (e.g., USB3 data received from the enhanced superspeed host 220 via multiplexer 224), and can wrap/packetize the data into USB4-specific tunneled packets (e.g., at least one downstream USB4 tunneled packet 356 in FIG. 3). The USB4 tunneled packets are communicated to the USB4 device 204 via a USB Type-C communication link (e.g., the communication link between USB Type-C connectors 230 and 252). Corresponding adapters (e.g., 278, 276, and 272) in the device router 268 receive the USB4 tunneled packets, and de-packetize the packets to obtain native display, PCIe, and USB3 data, which is sent to the corresponding endpoints or functions (e.g., DP display 266, PCIe function 264, and enhanced superspeed function 262) for display or processing. In some embodiments, the USB4 device 204 can be configured without DP, PCIe, or USB3 adapters.

USB2 data can be communicated from the USB 2.0 host 222 to the USB 2.0 function 258 directly (via the USB Type-C connectors 230 and 252), without USB4 packetization and de-packetization.

Even though FIG. 2 illustrates two PCIe and USB3 adapters in the USB4 host system 202, the disclosure is not limited in this regard and a different number of such adapters can be used (e.g., as many adapters as there are output ports).

The TMUs 242 and 274 are configured to provide time management and synchronization for sending, receiving, and processing of data by the USB4 host system 202 and the USB4 device 204.

In some aspects, the adapters used by the USB4 host system 202 and the USB4 device 204 are protocol-specific and can be configured based on configurations associated with the corresponding protocol.

Communication of USB4 tunneled packets between the USB4 host system 202 and the USB4 device 204 is performed via corresponding USB4 ports 250 and 270. The USB4 ports 250 and 270 are associated with corresponding USB Type-C connectors 230 and 252 and are used for managing USB4-related communications (e.g., bandwidth, timing, traffic prioritization, etc.). Port controllers 231 and 254 are configured to monitor communication channels (or pins) of the corresponding USB Type-C connectors 230 and 252. In some aspects, port controllers 231 and 254 are configured to perform other protocol-specific procedures, including power delivery (PD) negotiation or other procedures.

In some aspects, USB4 data is received by the host interface adapter 234, which allows the detection and enumeration of USB4 topology. The USB4 data can be packetized into the at least one USB4 tunneled packet by a USB4 adapter in the host router 214. The at least one USB4 tunneled packet is communicated to the USB4 device via the USB Type-C connectors 230 and 252.

In some aspects, USB2 data can be communicated from the USB 2.0 host 222 directly (e.g., via the USB Type-C connectors 230 and 252), without USB4 packetization and de-packetization.

In some aspects, USB4/USB3/DP PHYs, as well as a USB2 PHY, can be used when communicating via the USB Type-C connectors 230 and 252 (which can be similar to the USB Type-C connector 100 of FIG. 1). In some aspects, the USB4/USB3/DP PHYs are used to receive at least one incoming USB4 tunneled packet which is de-packetized by a USB4 adapter or by the corresponding other protocol-specific adapters (e.g., DP output adapter 278, PCIe upstream adapter 276, and USB3 upstream adapter 272).

In some embodiments, the USB4/USB3/DP PHYs as well as the USB2 PHY are part of a wireless communication link connecting the USB4 host system 202 to the USB4 device 204 or another computing device such as a USB-type device.

In some embodiments, the disclosed USB4 packetization includes wrapping native data, commands, or other configuration information (e.g., timestamp information) with a USB4 header to form one or more USB4 tunneled packets (e.g., the at least one downstream USB4 tunneled packet 356 and the at least one upstream USB4 tunneled packet 358).

Using a separate communication path outside of the USB4 host router 214 and a separate USB2 PHY with the USB Type-C connector 230 is associated with the following drawbacks: (a) there is no mechanism to tunnel USB2 data over the Tx/Rx lines used by the USB4/USB3/DP PHYs; (b) communication of USB2 data via the USB2 PHY is associated with dedicated USB Type-C pins to transmit USB2; and (c) communication of USB2 data via the USB2 PHY is associated with a dedicated physical layer (e.g., as illustrated in FIG. 1) and onboard routing to support USB2 in a USB4 solution.

The disclosed techniques include a method for tunneling USB2 data and sending such data along with other USB4 tunneled protocol packets over the Tx/Rx lines of a USB Type-C connector, without impacting the requirements for USB2 data transmission and utilizing the existing USB4 PHY. The disclosed techniques not only facilitate efficient use of bandwidth provided by USB4 but also helps reduce the additional physical layer complexity of supporting USB traffic (e.g., USB4 and USB2 traffic) over wired and wireless communication links.

The disclosed techniques for tunneling USB2 data in USB4-type devices are also associated with the following improvements: (a) reducing USB Type-C pin usage (e.g., providing the opportunity to reclaim and repurpose the D+/D− lines for other usages); (b) reducing the overall cost of the USB4 solution by removing the physical layer needed to support USB2 traffic; and (c) providing a mechanism to send all data traveling over the USB Type-C connection over the same wireless radio (e.g., for media-agnostic IP-based USB4 traffic), without having dedicated radio for USB2 transfers separated from the tunneled transfers.

Figure 3:
FIG. 3 illustrates a more detailed block diagram of a USB4 host system supporting USB2 tunneling, in accordance with some aspects.

FIG. 3 illustrates a more detailed block diagram 300 of a USB4 host system 302 supporting USB2 tunneling, in accordance with some aspects. Referring to FIG. 3, the USB4 host system 302 is coupled to a USB4 device 306 via a USB4 hub 304 and corresponding USB Type-C connectors 326 and 328 (at the USB4 host system 302), USB Type-C connectors 330, 340, and 342 (at the USB4 hub 304), and USB Type-C connector 344 (at the USB4 device 306).

The USB4 host system 302 includes a connection manager 308, a USB controller 312, and a USB4 host 316 with a host router 318. The host router 318 includes an input/output (I/O) controller 320 with scheduling logic 322 and a USB2 downstream adapter 324. The connection manager 308 includes a USB2 priority manager 310. The USB controller 312 includes bandwidth logic 314.

The USB4 hub 304 includes a device router 332 with an I/O controller 336 and USB2 arbitration logic 334 and 338. In some aspects, the USB4 hub 304 is an optional USB-based device. In some embodiments, tunneling-related functionalities of the USB4 hub 304 (e.g., functionalities of the aUSB2 arbitration logic 334) can be performed by the corresponding circuitry of the USB4 device 306.

The USB4 device 306 includes a device router 346 and a USB2 device 350. The device router 346 includes a USB2 upstream adapter 348.

In some embodiments, the host router 318 can detect the presence of the USB4 device 306 or the USB2 device 350 and can establish point-to-point tunneled paths between the USB4 host system 302 and the USB4 device 306. For example, the USB4 host system 302 (e.g., the host router 318) establishes a downstream tunneled path 352 and an upstream tunneled path 354. USB2 data is obtained by the USB2 downstream adapter 324 and packetized into at least one downstream USB4 tunneled packet 356. The at least one downstream USB4 tunneled packet 356 is communicated to the USB4 hub 304 and the USB4 device 306 via the downstream tunneled path 352.

At the USB4 device 306, the USB2 upstream adapter 348 de-packetizes the received at least one downstream USB4 tunneled packet 356 and communicates the obtained USB2 data to the USB2 device 350 for subsequent processing.

In some aspects, USB2 data generated by the USB2 device 350 is packetized by the USB2 upstream adapter 348 as at least one upstream USB4 tunneled packet 358 and communicated to the USB4 hub 304 and host router 318 via the upstream tunneled path 354. The USB2 downstream adapter 324 de-packetizes the at least one upstream USB4 tunneled packet 358 to obtain the USB2 data which can be communicated to the USB2 software stack (or USB2 SW) via the USB controller 312.

In some aspects, USB2 data traffic is host-driven data traffic with strict timing requirements for communication of USB2 commands, data, and acknowledgments. In this regard, scheduling logic 322 and the USB2 arbitration logic 334 and 338 are configured to perform USB2 traffic scheduling and arbitration/prioritization. For example, scheduling logic 322 can prioritize the communication and sending out of outgoing USB2 data packets packetized as at least one downstream USB4 tunneled packet 356. The arbitration logic 334 and 338 can perform arbitration among the different types of traffic (e.g., USB4 tunneled packets with DP, USB3, or USB4 data) as well as prioritize transmission or reception of USB2 traffic as needed (e.g., to comply with USB2 timing requirements/constraints for the outgoing or incoming USB2 data traffic).

In some embodiments, the connection manager 308 includes driver software to help with the enumeration of the USB4 topology connected to the USB4 host system 302. The connection manager 308 is also configured to manage (e.g., via the USB2 priority manager 310) bandwidth allocation and priority among data traffic for different communication protocols.

The bandwidth logic 314 of the USB controller 312 can communicate with the USB2 priority manager 310 in connection with adjusting bandwidth configurations for different protocol traffic. When a USB2 device 350 is attached to the USB topology of FIG. 3, the bandwidth logic 314 can determine whether the USB2 device 350 can be configured and used within the bandwidth constraints of the USB4 tunneled protocol. The bandwidth logic 314 is also used to determine if the bandwidth needed for certain types of USB2 packets is supported and available and requests any bandwidth adjustments from the USB2 priority manager 310.

In some aspects, communication between the USB2 priority manager 310 and the bandwidth logic 314 can be used for dynamic allocation and adjustment of communication bandwidth used for USB2 tunneled packet communication.

In some embodiments, the USB2 downstream adapter 324 and the USB2 upstream adapter 348 include timing information (e.g., a timestamp) when generating the at least one downstream USB4 tunneled packet 356 and the at least one upstream USB4 tunneled packet 358. Such timing information can be used for packet prioritization, traffic arbitration, and dynamic bandwidth adjustment in the USB4-based topology of FIG. 3.

In some aspects, the disclosed techniques can be used for tunneling USB2 data over the USB Type-C connection. Referring to FIG. 3, the USB2 downstream adapter 324 packetizes the USB2 data received from the USB2 controller into USB4 tunneled packets to be transmitted to the USB2 device 350 attached to the device router 346. The USB2 downstream adapter 324 also depacketizes the USB4 tunneled packets (e.g., the at least one upstream USB4 tunneled packet 358) to USB2 data received from the USB2 upstream adapter 348 and sends it to the USB2 controller (e.g., USB controller 312).

The USB2 upstream adapter 348 packetizes the USB2 data received from the USB2 device 350 into at least one upstream USB4 tunneled packet 358 to be transmitted to the USB2 controller (e.g., USB controller 312) attached to the host router 318. The USB2 upstream adapter 348 also de-packetizes the at least one downstream USB4 tunneled packet 356 received from the USB2 downstream adapter 324 and sends it to the USB2 device 350.

In some embodiments, an augmented interface is configured between the USB4 connection manager 308 and the USB stack (e.g., software and hardware) of the USB controller 312 to dynamically change the bandwidth allocation for the USB2 tunneled path (e.g., downstream tunneled path 352 and upstream tunneled path 354).

In some embodiments, the bandwidth logic 314 in the USB stack of the USB controller 312 is configured to (e.g., based on USB2 data to be transmitted) interact with the connection manager 308 to request the required bandwidth.

In some embodiments, the scheduling logic 322 is configured to determine when to schedule the USB2 transfers. The scheduling logic 322 can dynamically adjust the weight of the USB2 transfers along the USB2 tunneled path within the USB4 link without impacting the requirements for USB2 data transmission.

In some embodiments, the USB4 tunneled packet can be configured as a tunneled I/O packet type "USB2 Packet" containing USB2 data and at least one timestamp. In some embodiments, hardware logic (e.g., configured as part of the USB2 arbitration logic 334 and 338) along the USB4 path, determines (e.g., based on the at least one timestamp in the USB2 tunneled packet) if the packet needs to be transmitted ahead of current transfers in progress to meet the protocol requirements for USB2 packets. In some embodiments, the USB2 arbitration logic 334 and 338 checks the timestamp in USB2 tunneled packets to determine if the USB2 tunneled packets need to be transmitted ahead of other tunneled packets.

In some embodiments, when there is USB2 data transmission requested by the USB controller 312, the scheduling logic 322 in the host router 318 schedules USB2 transfers at a priority which can be the same as the priority of any other tunneled protocol with the highest priority.

Figure 4:
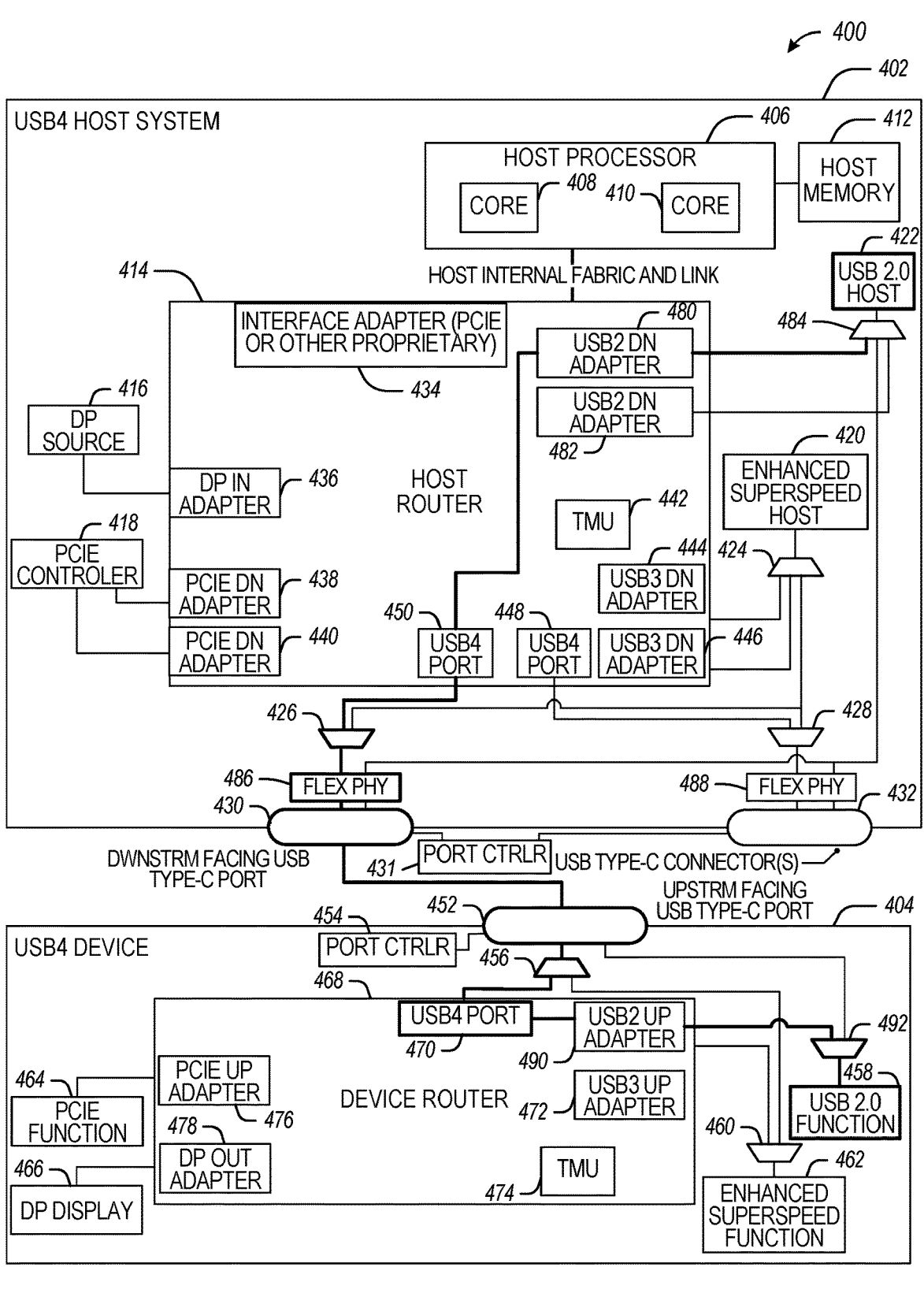
FIG. 4 illustrates a block diagram of a USB4 host system with USB2 support based on a USB2 adapter inside the USB4 host router, in accordance with some aspects.

FIG. 4 illustrates a block diagram 400 of a USB4 host system 402 with USB2 support based on a USB2 adapter inside the USB4 host router, in accordance with some aspects. Referring to FIG. 4, the USB4 host system 402 is communicatively coupled with the USB4 device 404. The USB4 host system 402 can include a host processor 406, a host router 414, a display port (DP) source 416, a PCIe controller 418, an enhanced superspeed host 420, a USB 2.0 host 422, multiplexers 424, 426, 428, and 484, USB Type-C connectors 430 and 432, and a port controller 431 (associated with both USB Type-C connectors 430 and 432). The host processor 406 can include processing cores 408 and 410 and can be coupled to host memory 412. USB Type-C connectors 430 and 432 are associated with corresponding physical layer (PHY) circuits (or flex PHYs) 486 and 488. The flex PHYs 486 and 488 can be configured as USB4/USB3/DP/USB2 PHYs.

The host router 414 can include an interface adapter 434 (e.g., for interfacing with the host processor 406), a DP input adapter 436, PCIe downstream adapters 438 and 440, a time management unit (TMU) 442, USB3 downstream adapters 444 and 446, USB4 ports 448 and 450 (associated with corresponding USB Type-C connectors 430 and 432), and USB2 downstream adapters 480 and 482 (which can be coupled to the USB 2.0 host 422 via multiplexer 484).

The USB4 device 404 can include a USB Type-C connector 452, multiplexers 456, 460, and 492, a device router 468, a PCIe function 464 (which can be configured as a PCIe circuit), a DP display 466, a USB 2.0 function 458 (which can be configured as a USB 2.0 circuit or device), a port controller 454 (associated with the USB Type-C connector 452), and an enhanced superspeed function 462 (which can be configured as an enhanced superspeed circuit associated with USB 3.0 data traffic processing).

As illustrated in FIG. 4, the USB4 host system 402 and the USB4 device 404 have protocol-specific adapters (e.g., DP, PCIe, USB2, and USB3-based adapters) which perform the packetizing of native data into USB4-specific tunneled packets and depacketizing of such packets. More specifically, the corresponding adapters (e.g., DP input adapter 436, PCIe downstream adapters 438 and 440, USB2 downstream adapters 480 and 482, and USB3 downstream adapters 444 and 446) in the host router 414 of the USB4 host system 402 can receive corresponding native display data (e.g., DP data from DP source 416), PCIe data (e.g., from PCIe controller 418), and native USB data (e.g., USB2 data received from the USB 2.0 host 422 via multiplexer 484 and USB3 data received from the enhanced superspeed host 420 via multiplexer 424), and can wrap/packetize the data into USB4-specific tunneled packets (e.g., at least one downstream USB4 tunneled packet 356 in FIG. 3). The USB4 tunneled packets are communicated to the USB4 device 404 via a USB Type-C communication link (e.g., the communication link between USB Type-C connectors 430 and 452). Corresponding adapters (e.g., DP output adapter 478, PCIe upstream adapter 476, USB2 upstream adapter 490, and USB3 upstream adapter 472) in the device router 468 receive the USB4 tunneled packets, and de-packetize the packets to obtain native display, PCIe, USB2, and USB3 data, which is sent to the corresponding endpoints or functions (e.g., DP display 266, PCIe function 264, USB 2.0 function 458, and enhanced superspeed function 462) for display or processing. In some embodiments, the USB4 device 404 can be configured without DP, PCIe, or USB3 adapters. Similarly, native display, PCIe, USB2, and USB3 data can be obtained by the corresponding adapters in the device router 468, packetized into at least one upstream USB4 tunneled packet (e.g., at least one upstream USB4 tunneled packet 358), and communicated to the USB4 host system 402 for de-packetization by the corresponding downstream adapters in the host router 414.

Even though FIG. 4 illustrates two PCIe and USB3 adapters in the USB4 host system 402, the disclosure is not limited in this regard and a different number of such adapters can be used (e.g., as many adapters as there are output ports).

The TMUs 442 and 474 are configured to provide time management and synchronization for sending, receiving, and processing of data by the USB4 host system 402 and the USB4 device 404.

In some aspects, the adapters used by the USB4 host system 402 and the USB4 device 404 are protocol-specific and can be configured based on configurations associated with the corresponding protocol.

Communication of USB4 tunneled packets between the USB4 host system 402 and the USB4 device 404 is performed via corresponding USB4 ports 450 and 470. The USB4 ports 450 and 470 are associated with corresponding USB Type-C connectors 430 and 452 and are used for managing USB4-related communications (e.g., bandwidth, timing, traffic prioritization, etc.). Port controllers 431 and 454 are configured to monitor communication channels (or pins) of the corresponding USB Type-C connectors 430 and 452. In some aspects, port controllers 431 and 454 are configured to perform other protocol-specific procedures, including power delivery (PD) negotiation or other procedures.

In some aspects, USB4 data is received by the host interface adapter 434, which allows the detection and enumeration of USB4 topology. The USB4 data can be packetized into the at least one USB4 tunneled packet by a USB4 adapter in the host router 414. The at least one USB4 tunneled packet is communicated to the USB4 device via the USB Type-C connectors 430 and 452. The host interface adapter 434 of the USB4 host router 414 allows the detection and enumeration of the USB4 topology illustrated in FIG. 4.

In some aspects, flex PHYs 486 and 488 (e.g., USB4/USB3/DP/USB2 PHYs) can be used when communicating via the USB Type-C connectors 430 and 452 (which can be similar to the USB Type-C connector 100 of FIG. 1). In some aspects, the flex PHYs 486 and 488 are used to receive at least one incoming USB4 tunneled packet which is de-packetized by a USB4 adapter or by the corresponding other protocol-specific adapters in the device router 468 (e.g., DP output adapter 478, PCIe upstream adapter 476, USB2 upstream adapter 490, and USB3 upstream adapter 472).

In some embodiments, the flex PHYs 486 and 488 are part of a wireless communication link connecting the USB4 host system 402 to the USB4 device 404 or another computing device such as a USB-type device.

In some embodiments, the disclosed USB4 packetization includes wrapping native data, commands, or other configuration information (e.g., timestamp information) with a USB4 header to form one or more USB4 tunneled packets (e.g., the at least one downstream USB4 tunneled packet 356 and the at least one upstream USB4 tunneled packet 358).

Figure 5:
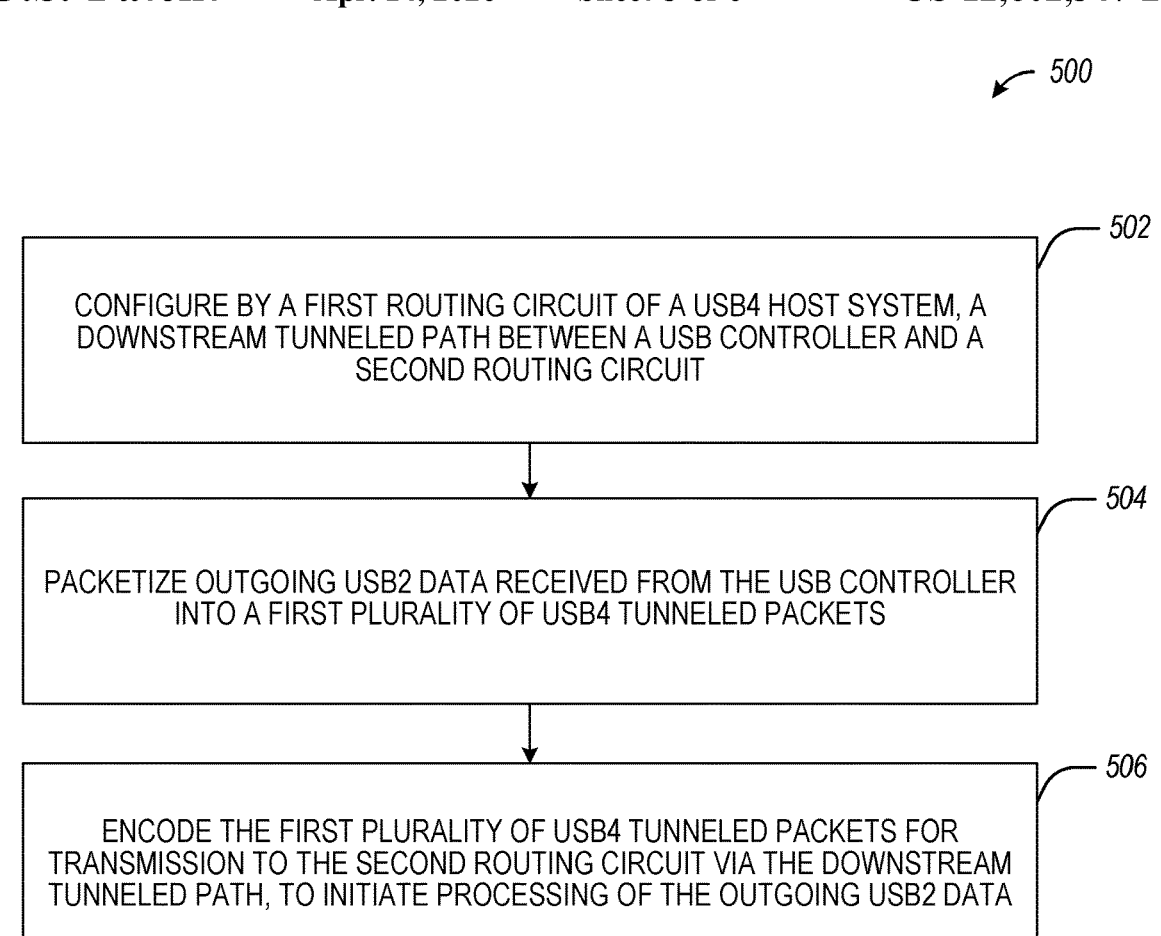
FIG. 5 is a flow diagram of a method of tunneling USB2 data, in accordance with some aspects.

FIG. 5 is a flow diagram of a method 500 of tunneling USB2 data, in accordance with some aspects. In some embodiments, method 500 may be performed by one or more circuitry of the USB4 host system 302 (e.g., USB controller 312 and/or host router 318). Referring to FIG. 5, at operation 502, a downstream tunneled path (e.g., downstream tunneled path 352) is configured by a first routing circuit (e.g., host router 318) of a Universal Serial Bus 4

(USB4) host system (e.g., USB4 host system 302). The downstream tunneled path is configured between a USB controller (e.g., USB controller 312) of the USB4 host system and a second routing circuit (e.g., device router 346 of USB4 device 306).

At operation 504, outgoing USB2 data received from the USB controller is packetized into a first plurality of USB4 tunneled packets. For example, USB2 data is received by the USB2 downstream adapter 324 of the host router 318 and is packetized into at least one downstream USB4 tunneled packet 356.

At operation 506, the first plurality of USB4 tunneled packets is encoded for transmission to the second routing circuit via the downstream tunneled path, to initiate the processing of the outgoing USB2 data by a USB2 device associated with the second routing circuit. For example, the at least one downstream USB4 tunneled packet 356 is transmitted to the device router 346 via the downstream tunneled path 352. The at least one downstream USB4 tunneled packet 356 is de-packetized by the USB2 upstream adapter 348 to obtain USB2 data, which is communicated to the USB2 device 350.

Figure 6:
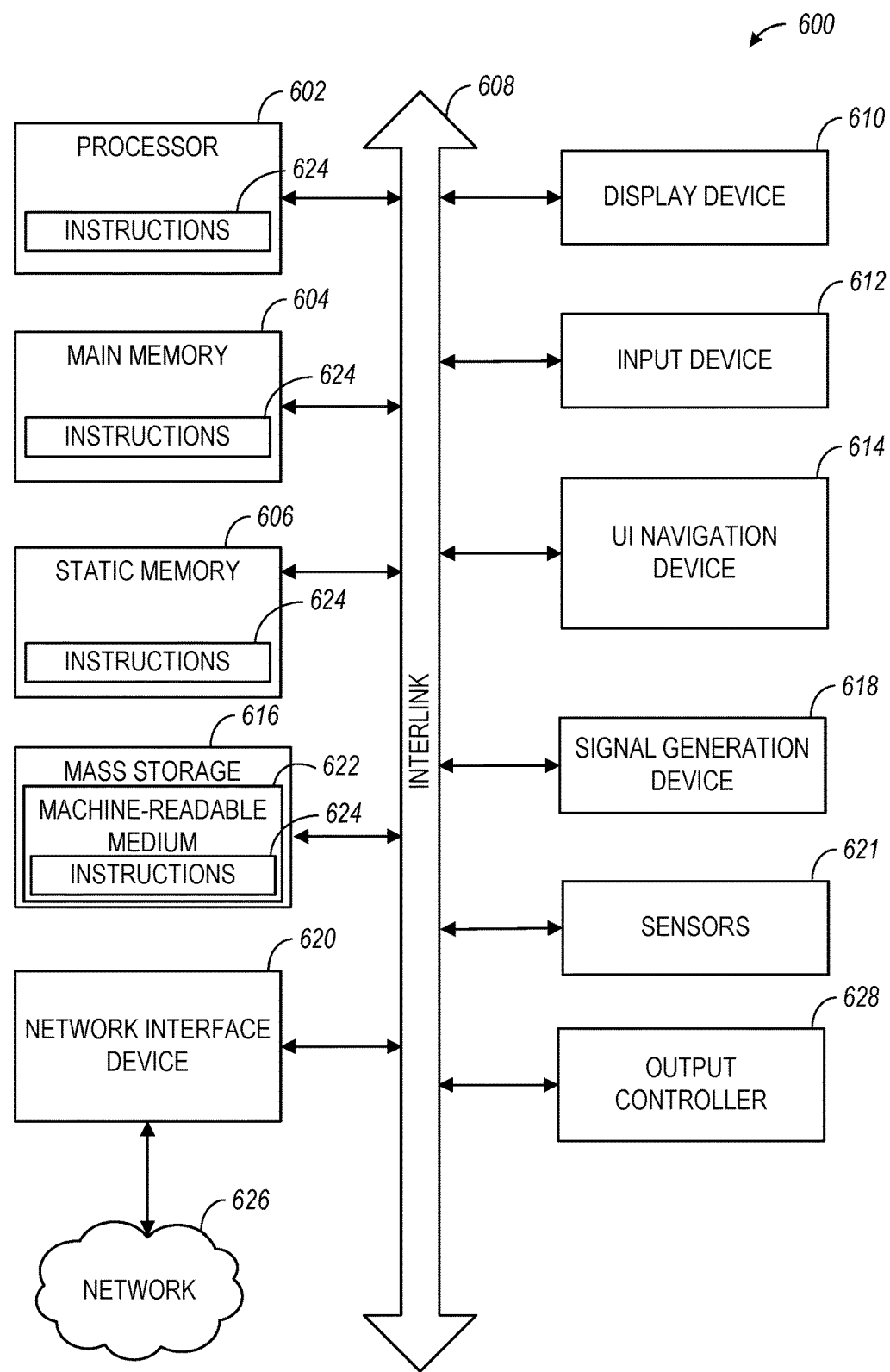
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may be performed. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in a peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612, and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensors. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

The term "machine-readable medium" may include any medium that is capable of storing, encoding, or carrying instructions for execution by the machine 600 and that causes the machine 600 to perform any one or more of the techniques of the present disclosure, or that is capable of storing, encoding or carrying data structures used by or associated with such instructions. Non-limiting machine-readable medium examples may include solid-state memories and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include the following: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of several transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The term "transmission medium" shall be taken to include any intangible medium that is capable of storing, encoding, or carrying instructions for execution by the machine 600, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is a Universal Serial Bus 4 (USB4) host system for tunneling USB2 data, the system comprising: a USB controller; and a first routing circuit communicatively coupled to the USB controller, wherein the first routing circuit is to: configure a downstream tunneled path between the USB controller and a second routing circuit; packetize outgoing USB2 data received from the USB controller into a first plurality of USB4 tunneled packets; and encode the first plurality of USB4 tunneled packets for transmission to the second routing circuit via the downstream tunneled path, to initiate processing of the outgoing USB2 data by a USB2 device associated with the second routing circuit.

In Example 2, the subject matter of Example 1 includes, wherein the first routing circuit is further to: configure an upstream tunneled path between the second routing circuit and the USB controller.

In Example 3, the subject matter of Example 2 includes, wherein the first routing circuit is further to: decode a second plurality of USB4 tunneled packets to obtain incoming USB2 data, the second plurality of USB4 tunneled packets received from the second routing circuit via the upstream tunneled path; and communicate the incoming USB2 data to the USB controller.

In Example 4, the subject matter of Examples 2-3 includes, wherein the first routing circuit is further to: configure the upstream tunneled path and the downstream tunneled path to include a USB Type-C communication link between the USB4 host system and a USB4 device including the second routing circuit.

In Example 5, the subject matter of Examples 2-4 includes, wherein the first routing circuit is further to: configure the upstream tunneled path and the downstream tunneled path to include a wireless communication link between the USB4 host system and a USB4 device including the second routing circuit.

In Example 6, the subject matter of Examples 3-5 includes, a connection manager, the connection manager coupled to the USB controller via a communication interface, and the connection manager is to: perform bandwidth allocation for transmission of the first plurality of USB4 tunneled packets and reception of the second plurality of USB4 tunneled packets.

In Example 7, the subject matter of Example 6 includes, wherein the connection manager is further to: decode a bandwidth re-allocation request received from the USB controller via the communication interface, the bandwidth re-allocation request based on a size of the outgoing USB2 data; and adjust the bandwidth allocation for the transmission of the first plurality of USB4 tunneled packets based on the bandwidth re-allocation request.

In Example 8, the subject matter of Examples 1-7 includes, wherein the first routing circuit comprises scheduling logic, and the first routing circuit is further to: detect a timing requirement associated with the outgoing USB2 data; and schedule transmission of the first plurality of USB4 tunneled packets based on the timing requirement and using the scheduling logic.

In Example 9, the subject matter of Example 8 includes, wherein the first routing circuit is further to: packetize the timing requirement with the outgoing USB2 data to form the first plurality of USB4 tunneled packets.

Example 10 is a Universal Serial Bus (USB) device for processing tunneled USB2 data, the device comprising: a Universal Serial Bus (USB) Type-C connector and a first routing circuit communicatively coupled to the USB Type-C connector. The first routing circuit is configured to decode USB2 data received from a USB2 device, packetize the USB2 data received from the USB2 device into a plurality of USB4 tunneled packets, and encode the plurality of USB4 tunneled packets for transmission to a second routing circuit via an upstream tunneled path between the first routing circuit and a USB controller of a USB4 host system, the upstream tunneled path including the USB Type-C connector.

In Example 11, the subject matter of Example 10 includes physical layer (PHY) circuitry, wherein the first routing circuit is further to: encode the plurality of USB4 tunneled packets for transmission to the second routing circuit via the USB3/USB4 PHY circuitry.

Example 12 is a method for tunneling USB2 data, the method comprising: configuring by a first routing circuit of a Universal Serial Bus 4 (USB4) host system, a downstream tunneled path between a USB controller of the USB4 host system, and a second routing circuit; packetizing outgoing USB2 data received from the USB controller into a first plurality of USB4 tunneled packets; and encoding the first plurality of USB4 tunneled packets for transmission to the second routing circuit via the downstream tunneled path, to initiate processing of the outgoing USB2 data by a USB2 device associated with the second routing circuit.

In Example 13, the subject matter of Example 12 includes, configuring an upstream tunneled path between the second routing circuit and the USB controller.

In Example 14, the subject matter of Example 13 includes, decoding a second plurality of USB4 tunneled packets to obtain incoming USB2 data, the second plurality of USB4 tunneled packets received from the second routing circuit via the upstream tunneled path; and communicating the incoming USB2 data to the USB controller.

In Example 15, the subject matter of Examples 13-14 includes, configuring the upstream tunneled path and the downstream tunneled path to include a USB Type-C communication link between the USB4 host system and a USB4 device including the second routing circuit.

In Example 16, the subject matter of Examples 13-15 includes, configuring the upstream tunneled path and the downstream tunneled path to include a wireless communication link between the USB4 host system and a USB4 device including the second routing circuit.

In Example 17, the subject matter of Examples 14-16 includes, performing bandwidth allocation for transmission of the first plurality of USB4 tunneled packets and reception of the second plurality of USB4 tunneled packets.

In Example 18, the subject matter of Example 17 includes, decoding a bandwidth re-allocation request received from the USB controller via a communication interface, the bandwidth re-allocation request based on a size of the outgoing USB2 data; and adjusting the bandwidth allocation for the transmission of the first plurality of USB4 tunneled packets based on the bandwidth re-allocation request.

In Example 19, the subject matter of Examples 12-18 includes, detecting a timing requirement associated with the outgoing USB2 data; and scheduling transmission of the first plurality of USB4 tunneled packets based on the timing requirement.

In Example 20, the subject matter of Example 19 includes, packetizing the timing requirement with the outgoing USB2 data to form the first plurality of USB4 tunneled packets.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. A Universal Serial Bus 4 (USB4) host system for tunneling USB2 data, the system comprising:

a USB controller; and a first routing circuit communicatively coupled to the USB controller, wherein the first routing circuit is to:

configure a downstream tunneled path between the USB controller and a second routing circuit;

packetize outgoing USB2 data received from the USB controller together with timing information into a first plurality of USB4 tunneled packets; and encode the first plurality of USB4 tunneled packets for transmission to the second routing circuit via the downstream tunneled path based on the timing information, to initiate processing of the outgoing USB2 data by a USB2 device associated with the second routing circuit, the transmission being dynamically adjusted based on a size of the outgoing USB2 data.

2. The USB4 host system of claim 1, wherein the first routing circuit is further to:

configure an upstream tunneled path between the second routing circuit and the USB controller.

3. The USB4 host system of claim 2, wherein the first routing circuit is further to:

decode a second plurality of USB4 tunneled packets to obtain incoming USB2 data, the second plurality of USB4 tunneled packets received from the second routing circuit via the upstream tunneled path; and
communicate the incoming USB2 data to the USB controller.

4. The USB4 host system of claim 2, wherein the first routing circuit is further to:
configure the upstream tunneled path and the downstream tunneled path to include a USB Type-C communication link between the USB4 host system and a USB4 device including the second routing circuit.

5. The USB4 host system of claim 2, wherein the first routing circuit is further to:
configure the upstream tunneled path and the downstream tunneled path to include a wireless communication link between the USB4 host system and a USB4 device including the second routing circuit.

6. The USB4 host system of claim 3, further comprising a connection manager, the connection manager coupled to the USB controller via a communication interface, and the connection manager is to:
perform bandwidth allocation for transmission of the first plurality of USB4 tunneled packets and reception of the second plurality of USB4 tunneled packets.

7. The USB4 host system of claim 6, wherein the connection manager is further to:
decode a bandwidth re-allocation request received from the USB controller via the communication interface, the bandwidth re-allocation request based on a size of the outgoing USB2 data; and
adjust the bandwidth allocation for the transmission of the first plurality of USB4 tunneled packets based on the bandwidth re-allocation request.

8. The USB4 host system of claim 1, wherein the first routing circuit comprises scheduling logic, and the first routing circuit is further to:
detect a timing requirement associated with the outgoing USB2 data; and
schedule transmission of the first plurality of USB4 tunneled packets based on the timing requirement and using the scheduling logic.

9. The USB4 host system of claim 8, wherein the first routing circuit is further to:
packetize the timing requirement with the outgoing USB2 data to form the first plurality of USB4 tunneled packets.

10. A Universal Serial Bus (USB) device for processing tunneled USB2 data, the device comprising:
a Universal Serial Bus (USB) Type-C connector; and
a first routing circuit communicatively coupled to the USB Type-C connector, the first routing circuit configured to:
decode USB2 data received from a USB2 device;
packetize the USB2 data received from the USB2 device together with timing information into a plurality of USB4 tunneled packets; and
encode the plurality of USB4 tunneled packets for transmission to a second routing circuit via an upstream tunneled path between the first routing circuit and a USB controller of a USB4 host system based on the timing information, the upstream tunneled path including the USB Type-C connector, the transmission being dynamically adjusted based on a size of the USB2 data.

11. The USB device of claim 10, further comprising USB3/USB4 physical layer (PHY) circuitry, and wherein the first routing circuit is further to:
encode the plurality of USB4 tunneled packets for transmission to the second routing circuit via the USB3/USB4 PHY circuitry.

12. A method for tunneling USB2 data, the method comprising:
configuring by a first routing circuit of a Universal Serial Bus 4 (USB4) host system, a downstream tunneled path between a USB controller of the USB4 host system and a second routing circuit;
packetizing outgoing USB2 data received from the USB controller together with timing information into a first plurality of USB4 tunneled packets; and
encoding the first plurality of USB4 tunneled packets for transmission to the second routing circuit via the downstream tunneled path based on the timing information, to initiate processing of the outgoing USB2 data by a USB2 device associated with the second routing circuit, the transmission being dynamically adjusted based on a size of the outgoing USB2 data.

13. The method of claim 12, further comprising:
configuring an upstream tunneled path between the second routing circuit and the USB controller.

14. The method of claim 13, further comprising:
decoding a second plurality of USB4 tunneled packets to obtain incoming USB2 data, the second plurality of USB4 tunneled packets received from the second routing circuit via the upstream tunneled path; and
communicating the incoming USB2 data to the USB controller.

15. The method of claim 13, further comprising:
configuring the upstream tunneled path and the downstream tunneled path to include a USB Type-C communication link between the USB4 host system and a USB4 device including the second routing circuit.

16. The method of claim 13, further comprising:
configuring the upstream tunneled path and the downstream tunneled path to include a wireless communication link between the USB4 host system and a USB4 device including the second routing circuit.

17. The method of claim 14, further comprising:
performing bandwidth allocation for transmission of the first plurality of USB4 tunneled packets and reception of the second plurality of USB4 tunneled packets.

18. The method of claim 17, further comprising:
decoding a bandwidth re-allocation request received from the USB controller via a communication interface, the bandwidth re-allocation request based on a size of the outgoing USB2 data; and
adjusting the bandwidth allocation for the transmission of the first plurality of USB4 tunneled packets based on the bandwidth re-allocation request.

19. The method of claim 12, further comprising:
detecting a timing requirement associated with the outgoing USB2 data; and
scheduling transmission of the first plurality of USB4 tunneled packets based on the timing requirement.

20. The method of claim 19, further comprising:
packetizing the timing requirement with the outgoing USB2 data to form the first plurality of USB4 tunneled packets.

* * * * *